(No Model.)
C. A. BEHLEN.
CARRIAGE SPRING.
No. 528,458. Patented Oct. 30, 1894.
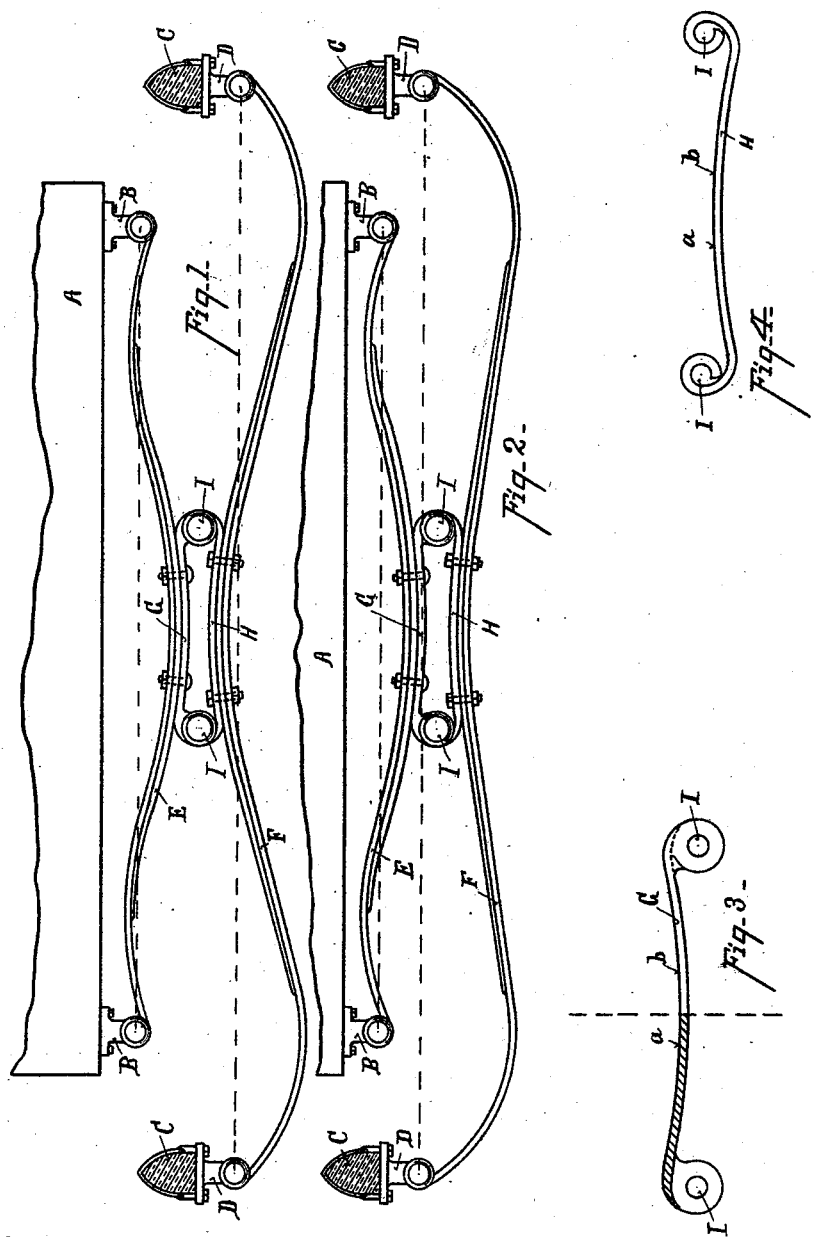
Attest
C. W. Miles
Oliver D. Kaiser
Inventor
C. A. Behlen
By Wood & Boyd atty

UNITED STATES PATENT OFFICE.

CHARLES A. BEHLEN, OF CINCINNATI, OHIO.

CARRIAGE-SPRING.

SPECIFICATION forming part of Letters Patent No. 528,458, dated October 30, 1894.

Application filed February 15, 1894. Serial No. 500,262. (No model.)

*To all whom it may concern:*

Be it known that I, CHARLES A. BEHLEN, a citizen of the United States, residing at Cincinnati, in the county of Hamilton and State of Ohio, have invented certain new and useful Improvements in Carriage-Springs, of which the following is a specification.

My invention relates to a carriage spring which for convenience of illustration is shown attached to the side bars and body.

The object of my invention is to employ a compound spring the sections of which are connected together by two axial joints which have yielding or spring supports whereby the strain is distributed over a large amount of metal and having no dead or terminal points where the strains concentrate outside of the centers.

The various features of my invention are fully set forth in the description of the accompanying drawings making part of this specification, in which—

Figure 1 is a side elevation of my improvement attached to the wagon body. Fig. 2 is a modification of Fig. 1, showing the spring partly compressed. Fig. 3 is a side elevation of one-half of the central axial support. Fig. 4 is a side elevation of the opposite central axial support.

A represents a carriage body; B, brackets to which one member of the compound spring is attached. C represents the side bars; D, the shackles or brackets to which the opposite member of the spring is connected.

My compound spring is primarily composed of two members E, F, and they are connected together by means of two axial supports G, H, which are hinged together at each end by the axial bolts I, I. One of the axial supports, say G, is firmly united to the upper member E of the spring, and the lower axial support H is firmly connected to the lower member F of the spring, by means of the bolts or clips.

Mode of operation: When weight is applied to the carriage the two members of the spring are compressed and their outer ends brought nearer together. The strain from each end of the spring is transferred to the axes I, I, which are held by yielding supports G, H, on each side. Hence, the central portions of the spring E, F, and their attached members G, H, move away from each other as shown in Fig. 2, thus distributing the strains to the central portions of the spring over the axial bolts I, I, instead of terminating the strains at some determined point of the spring, as is the case in other compound springs heretofore employed. This result is accomplished by means of the two central axes I, I, held by yielding supports G, H, which are themselves springs and co-operate in sustaining and taking the strain of the load. I have shown the supports of the axes I, I, made of two pieces of metal, but the central portions between the points $a$, $b$, might be removed making the supports of four pieces instead of two without materially affecting the operation providing the metal in the central portion of the spring E, F, is correspondingly increased.

The principal feature of the invention is the hinging of the spring members E, F, together upon the axes I, I. I have shown in Fig. 1 both springs of the double curved form, so as to prevent lengthening of the spring by increase of curvature of spring which is the preferred form of construction. Other well known instrumentalities may be employed, however, when the spring is of other forms, such as the movement of the outer axial bolts in the eye of the shackle, or by the employment of swinging shackles.

Having described my invention, what I claim is—

1. A compound spring consisting of the opposite reversible curved sections E and F, hinged together centrally by axes I, I, the end of one section being adapted to be hinged to the body and the end of the other to the carriage gear, substantially as specified.

2. A compound spring consisting of the members E, F, the axial supports G, H, and the connecting axes I, I, substantially as described.

In testimony whereof I have hereunto set my hand.

CHARLES A. BEHLEN.

Witnesses:
T. SIMMONS,
WILL R. WOOD.